US011232784B1

(12) United States Patent
Mallikarjuniah et al.

(10) Patent No.: US 11,232,784 B1
(45) Date of Patent: Jan. 25, 2022

(54) NATURAL LANGUAGE DIALOG SCORING

(71) Applicant: Amazon Technologies, Inc., Seattle, WA (US)

(72) Inventors: Ravi Chikkanayakanahalli Mallikarjuniah, Sammamish, WA (US); Priya Rao Chagaleti, Seattle, WA (US); Shiladitya Roy, Bellevue, WA (US); Christopher Forbes Will, Boston, MA (US); Cole Ira Brendel, Malden, MA (US); Wei Huang, Kirkland, WA (US); Sarthak Anand, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 288 days.

(21) Appl. No.: 16/425,203

(22) Filed: May 29, 2019

(51) Int. Cl.
| | | |
|---|---|---|
| *G10L 15/22* | (2006.01) | |
| *G10L 15/18* | (2013.01) | |
| *G10L 15/30* | (2013.01) | |
| *G10L 15/08* | (2006.01) | |
| *G10L 15/14* | (2006.01) | |
| *G10L 15/16* | (2006.01) | |
| *G06F 40/30* | (2020.01) | |
| *G10L 15/01* | (2013.01) | |
| *G06F 40/35* | (2020.01) | |

(52) U.S. Cl.
CPC .......... *G10L 15/1815* (2013.01); *G10L 15/22* (2013.01); *G10L 15/30* (2013.01); *G06F 40/30* (2020.01); *G06F 40/35* (2020.01); *G10L 15/01* (2013.01); *G10L 15/142* (2013.01); *G10L 15/16* (2013.01); *G10L 2015/088* (2013.01); *G10L 2015/223* (2013.01)

(58) Field of Classification Search
CPC .......... G10L 15/01; G10L 15/22; G06F 40/35
See application file for complete search history.

(56) References Cited

U.S. PATENT DOCUMENTS

| | | | |
|---|---|---|---|
| 9,672,812 B1 * | 6/2017 | Watanabe | ............... G10L 15/22 |
| 10,049,668 B2 | 8/2018 | Huang et al. | |
| 10,209,853 B2 | 2/2019 | Weng et al. | |
| 10,412,206 B1 | 9/2019 | Liang et al. | |

(Continued)

OTHER PUBLICATIONS

"Analytics and Health", https://developers.google.com/actions/console/analytics, retrieved Aug. 2019.

(Continued)

*Primary Examiner* — Feng-Tzer Tzeng
(74) *Attorney, Agent, or Firm* — Pierce Atwood LLP

(57) ABSTRACT

Techniques for generating a conformance score for a system/user dialog are described. A conformance score may represent a degree to which output data, provided by a skill, conforms to various policies (e.g., the data includes content appropriate for the age of the user, the data does not include profanity, etc.). User input data and system output data, corresponding to a dialog exchange between a user and a skill, ma be determined. A user type associated with the dialog exchange may also be determined. Based on the user type and the system output data, it may be determined that one or more filtering resources are to be assigned to process future data, received from the skill, prior to the future data being presented to a user.

18 Claims, 10 Drawing Sheets

(56) References Cited

U.S. PATENT DOCUMENTS

| | | | |
|---|---|---|---|
| 10,498,883 | B1 | 12/2019 | Krebs et al. |
| 10,535,341 | B2 | 1/2020 | Penilla et al. |
| 10,572,640 | B2 | 2/2020 | Yan et al. |
| 10,679,013 | B2 | 6/2020 | Raanani et al. |
| 10,705,794 | B2 | 7/2020 | Gruber et al. |
| 10,884,503 | B2 | 1/2021 | Divakaran et al. |
| 10,924,926 | B1 | 2/2021 | Nadig et al. |
| 2003/0061029 | A1 | 3/2003 | Shaket et al. |
| 2009/0306995 | A1* | 12/2009 | Weng .................. G06Q 10/103 705/301 |
| 2010/0166158 | A1* | 7/2010 | Costello ............. H04M 3/5166 379/88.04 |
| 2013/0275138 | A1 | 10/2013 | Gruber et al. |
| 2013/0275875 | A1 | 10/2013 | Gruber et al. |
| 2013/0275899 | A1 | 10/2013 | Schubert et al. |
| 2014/0337266 | A1 | 11/2014 | Kalns et al. |
| 2014/0337814 | A1 | 11/2014 | Kalns et al. |
| 2016/0078866 | A1* | 3/2016 | Gelfenbeyn .......... G06F 40/247 704/9 |
| 2016/0313868 | A1 | 10/2016 | Weng et al. |
| 2017/0025124 | A1 | 1/2017 | Mixter et al. |
| 2017/0092151 | A1 | 3/2017 | Xi et al. |
| 2017/0140141 | A1 | 5/2017 | Yan et al. |
| 2017/0160813 | A1 | 6/2017 | Divakaran et al. |
| 2017/0200449 | A1 | 7/2017 | Penilla et al. |
| 2018/0229372 | A1 | 8/2018 | Breazeal et al. |
| 2019/0057079 | A1 | 2/2019 | Raanani et al. |
| 2019/0095050 | A1 | 3/2019 | Gruber et al. |
| 2019/0103101 | A1 | 4/2019 | Danila et al. |
| 2020/0110915 | A1 | 4/2020 | Long et al. |
| 2020/0160860 | A1 | 5/2020 | Singh et al. |
| 2020/0334419 | A1 | 10/2020 | Raanani et al. |

OTHER PUBLICATIONS

U.S. Appl. No. 16/425,164, filed May 29, 2019.
U.S. Appl. No. 16/425,101, filed May 29, 2019.
U.S. Appl. No. 16/425,141, filed May 29, 2019.

* cited by examiner

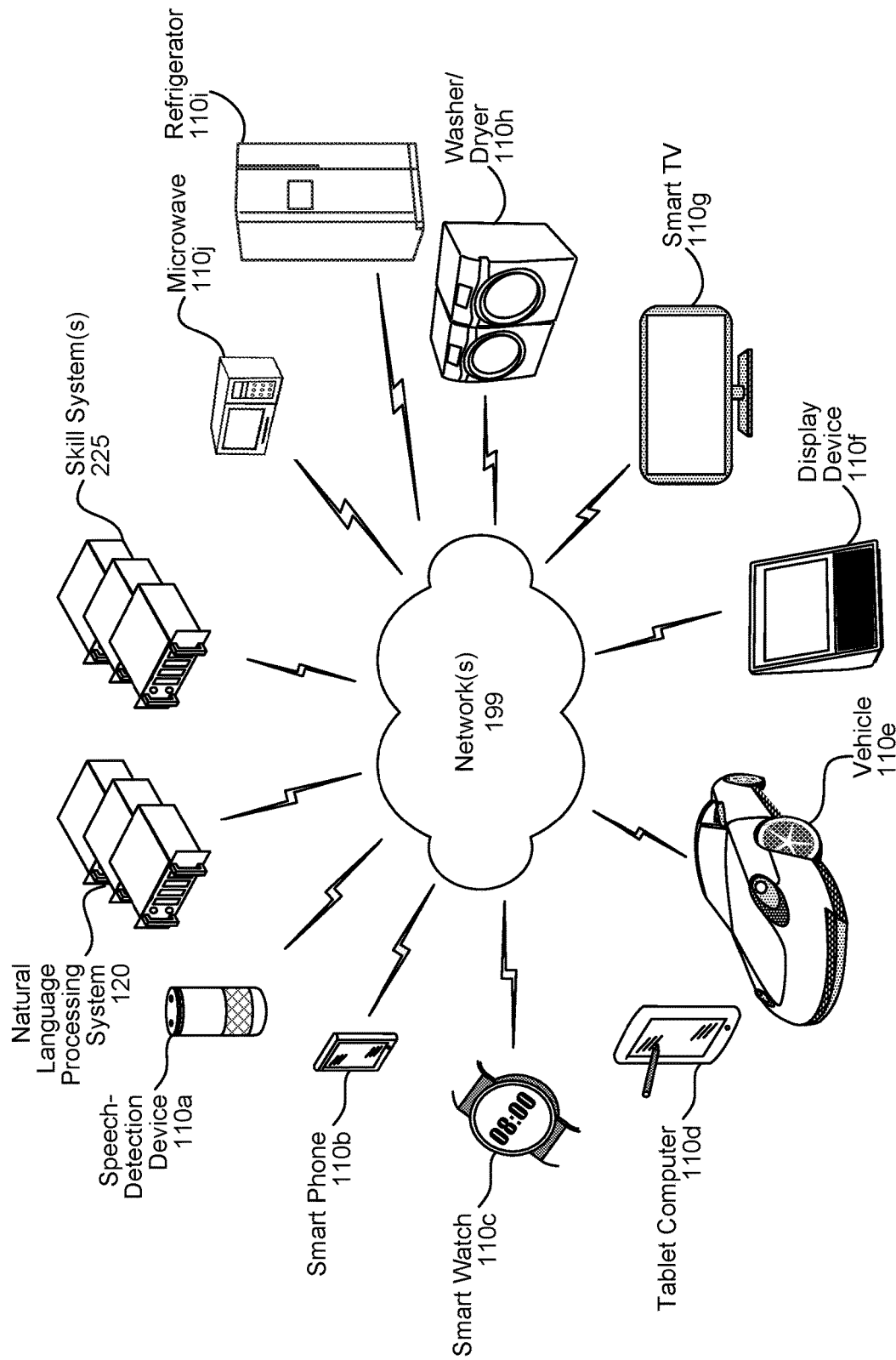

NATURAL LANGUAGE DIALOG SCORING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 10 illustrates an example of a computer network for use with the overall system, in accordance with embodiments of the present disclosure.

DETAILED DESCRIPTION

Figure 1:
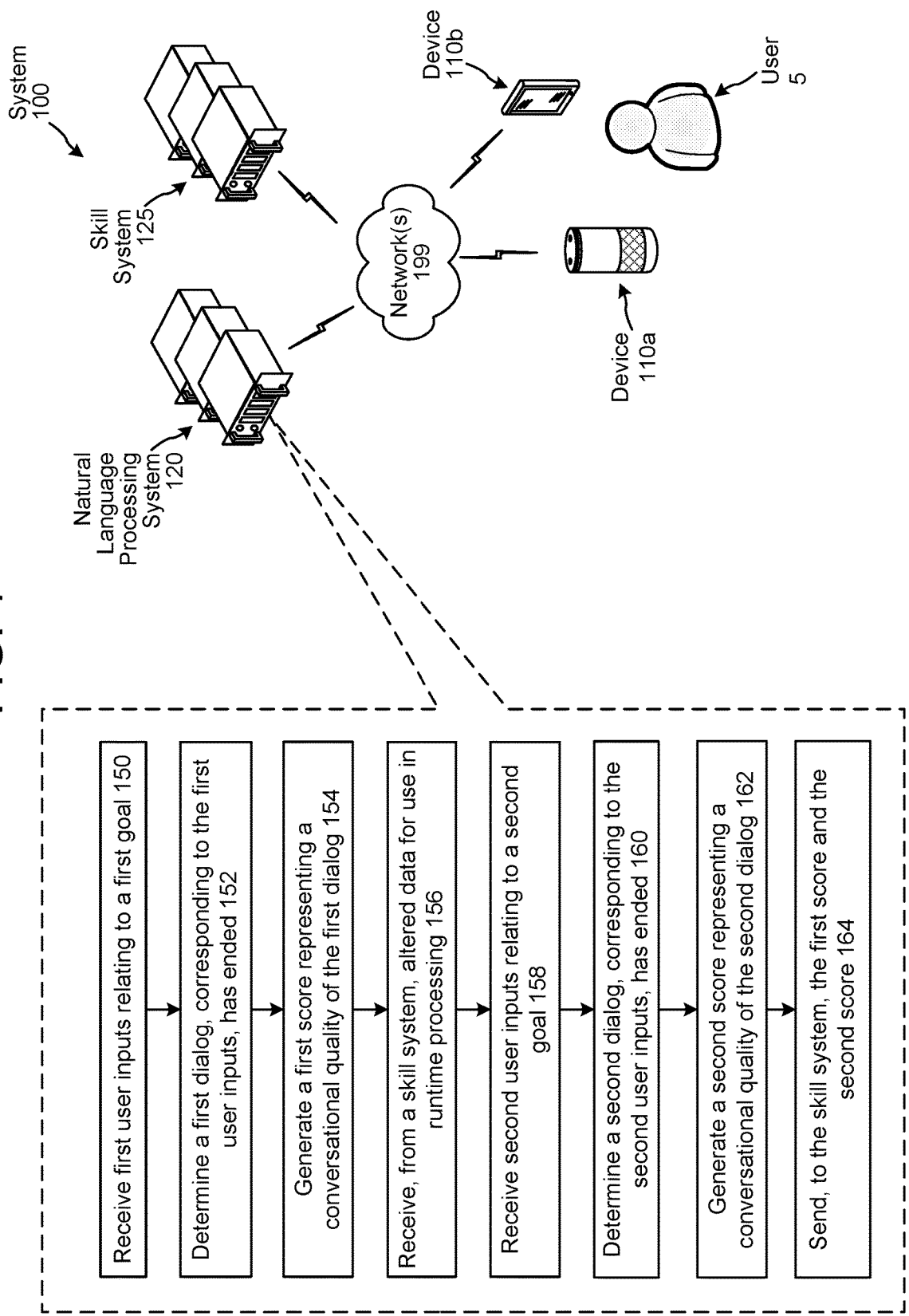
FIG. 1 illustrates a system for scoring dialogs, in accordance with embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Speech processing may also include processing audio data directly into a representation of an utterance (such as in the form of NLU output data) without necessarily going through an ASR process first. Text-to-speech (TTS) is a field of concerning transforming textual data into audio data that is synthesized to resemble human speech.

A natural language processing system may be configured to receive a user input (either spoken or text-based), process the user input to determine an intent of the user, and perform an action based on the intent substantive content of the user input. For example, for the user input of "play Adele music," a natural language processing system may output music sung by an artist named Adele. For further example, for the user input of "turn on the lights," a natural language processing system may turn on "smart" lights associated with the user's profile.

In at least some examples, a skill (implemented by or associated with the natural language processing system) may perform the action. As used herein, a "skill" may refer to software, running on or in communication with the natural language processing system, that is akin to a software application running on a traditional computing device. That is, a skill may enable the natural language processing system to execute specific functionality in order to provide data or produce some other requested output (collectively referred to herein as "actions"). In at least some examples, a skill is a component that receives data generated by the natural language processing system. Such data may be a machine representation of an utterance that was spoken by a user. A skill may process such received data to perform an action. While "skill" may be used herein, the functionality described herein as a skill may be referred to using many different terms, such as an action, bot, app, or the like.

One or more turns may occur between when a first user input of a dialog is received and when an action is performed that culminates processing performed with respect to the user dialog. As used herein, a "user turn" may refer to a device 110 sending, to the natural language processing system 120 data representing an event (e.g., data representing a natural language user input). Each event may be assigned an identifier generated by the device 110 for the event. As such, if the device 110 sends multiple events during a single dialog, each event may be associated with a different identifier. An identifier may be used by a device 110 for events of different dialogs, but may not be used by the device 110 for more than one event of the same dialog.

As used herein, a "device turn" may refer to processing, performed by the natural language processing system 120 and/or a skill system(s) 120, in response to a single event representing a natural language user input. A device turn may include one or more directives, with each directive representing a message, originating from the natural language processing system 120, that instructs a component of the natural language processing system 120 or a skill system 125 to perform some processing. The natural language processing system 120 and skill systems 125 may use an event's identifier to track processing performed with respect to a user input corresponding to the event.

The following is an illustrative sequence of user turns and device turns from the user perspective:

[User Turn] user speaks "Alexa, find me a recipe with winter squash" to a device

[Device Turn] the device outputs synthesized speech corresponding to "I found 10 recipes with winter squash" and displays a list of the recipes on a screen While the above describes a device turn as processing performed by the device, a device turn may additionally include processing performed by a natural language processing system, such as ASR, NLU, etc. Thus, it will be appreciated that a device turn may start with processing performed from the time the user provides a user input to a device and end when a device outputs a response to the user input.

A single device turn, or a set of consecutive alternating device and user turns, having a common goal may be referred to herein as a "dialog." A dialog with one device turn may be referred to as a "single-turn dialog." An example of a single-turn dialog includes a device outputting a notification that is not responsive to any particular user input. Examples of such a notification include a notification that a text and/or spoken message has been received for the user to read or listen to, a notification that a ride sharing ride has arrived at a pick-up location, etc. A dialog with more than one device turn may be referred to as a "multi-turn dialog" or "dialog exchange."

As used herein, a "goal" may refer to expected natural language processing system processing corresponding to one or more related user inputs. The following is an example of a multi-turn dialog having turns directed to a common goal of booking a flight:

[User Turn] user speaks "Alexa, book me a flight to Seattle" to a device
[Device Turn] the device outputs synthesized speech corresponding to "when would you like to leave"
[User Turn] user speaks "March 25" to the device
[Device Turn] the device outputs synthesized speech corresponding to "when would you like to return"
[User Turn] user speaks "March 27" to a device
[Device Turn] the device outputs synthesized speech corresponding to "I found 5 trip itineraries" and displays a list of the itineraries on a screen
[User Turn] user speaks "book the first trip" to the device
[Device Turn] the device outputs synthesized speech corresponding to "I have booked the first trip"

In the above example multi-turn dialog, the first user input may correspond to a <BookFlight> intent. And each of the subsequent user and device turns may correspond to the goal of the natural language processing system 120 booking a flight with a system corresponding to an airline carrier. One skilled in the art will appreciate that the foregoing multi-turn dialog is provided purely for illustration, and that the present disclosure envisions various multi-turn dialogs relating to various goals.

The present disclosure provides techniques for scoring dialogs, for use by a natural language processing system components, skill components, and/or developers (e.g., skill developers, natural language processing system developers), to measure, control, visualize, and/or improve conversational quality of dialogs. As used herein, a "skill developer" may refer to a user, of a natural language processing system and/or a skill system, that has specific permissions to generate and alter data used by a skill to perform various processes.

A dialog may not be scored until after the dialog has finished (e.g., after an action has been performed that completes a goal. In such examples, scoring of a dialog may not occur as part of runtime processing.

The present disclosure provides various metrics that may be used to generate a score representing a conversational quality of a dialog. At least some metrics may be determined using deterministic algorithms, while at least some other metrics may be determined using one or more trained machine learning models. Example metrics include, but are not limited to, productivity, relevance, and naturalness. As used herein, "productivity" may refer to a measure of how accurate, correct, and efficient a dialog is. "Relevance" may refer to a level of applicability of a dialog to a user, a conversation context and its compliance to general relevance policies such as age appropriateness, and/or fairness against biases and profanity filtering. "Naturalness" may refer to an ability of the natural language processing system to allow a user to interact with the natural language processing system using natural language, an ability of a natural language processing system to be verbose or succinct while being complete in responding to user inputs, and/or an ability of a natural language processing system to be engaging by being non-repetitive or non-monotonous.

Various metrics, as described herein, may be used by a skill developer to objectively assess whether new features or versions of a skill are improving or degrading the conversational quality of the skill.

Each time a natural language processing system receives a user input, the natural language processing system attempts to select a skill that can most-appropriately perform an action(s) responsive to the user input. Various metrics, as described herein, may be used by a natural language processing system to select a most-appropriate skill for performing an action(s) responsive to a user input.

A natural language processing system may be configured with various intents, corresponding to various actions users may desire be performed. Example intents include, but are not limited to <PlayMusic>, <BookFlight>, <OutputWeather>, etc. More than one skill may be associated with a particular intent. In other words, more than one skill may be invoked to execute when a user input corresponds to the particular intent. Various metrics, as described herein, may be used by the natural language processing system to refine, at runtime, which skills may be invoked to process with respect to a user input.

The natural language processing system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The natural language processing system and techniques can be implemented on a geographic basis to ensure compliance with laws in various jurisdictions and entities in which the components of the natural language processing system and/or user are located.

FIG. 1 shows a system 100 configured to score dialogs. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more devices (110a/110b) local to a user 5, a natural language processing system 120, and a skill system 125 connected across one or more networks 199.

The device 110a may receive audio corresponding to a spoken user input originating from the user 5. The device 110a may generate audio data corresponding to the audio and may send the audio data to the natural language processing system 120. Alternatively, the device 110b may receive a text-based input from the user 5. The device 110b may generate text data corresponding to the text and may send the text data to the natural language processing system 120.

The device 110 may send the audio data and/or text data to the natural language processing system 120 via a companion application installed on the device 110. A companion application may enable the device 110 to communicate with the natural language processing system 120 via the network(s) 199. An example companion application is the Amazon Alexa application that may be installed on a smart phone, tablet, or the like.

The natural language processing system 120 may receive (150) various user inputs relating to a first goal (e.g., corresponding to first dialog). A skill system 125 may perform processing with respect to one or more device turns of the first dialog.

At some point, the natural language processing system 120 may determine (152) the first dialog has ended. Such may be determined in various ways. One way includes determining when a goal of a user input has changed. When the natural language processing system 120 receives a user input, the natural language processing system may assign the user input a dialog identifier. The dialog identifier may correspond to an ongoing dialog if the natural language processing system 120 determines the user input relates to a goal of the ongoing dialog. Alternatively, the natural language processing system 120 may assign a new dialog identifier, representing a newly started dialog, if the natural language processing system 120 determines the user input relates to a goal that does not correspond to a goal of most-recently ongoing dialog performed using the device 110 from which the user input was received. In such an example, the natural language processing system 120 may determine the first dialog has ended based on determining the user input does not correspond to the goal of the most-recently ongoing dialog. As an example, the ongoing dialog may relate to a goal of booking a flight. A most-recent user input, received from the same device 110 through which the ongoing dialog was performed, may relate to a goal of playing music. The natural language processing system 120's determination that the most-recent user input corresponds to the goal of playing music may effectively determine that the dialog, relating to the goal of booking a fight, has ended. When the natural language processing system 120 determines a dialog has ended, in addition to generating a new dialog identifier for the most-recent user input, the natural language processing system 120 may associate data, corresponding to system 100 processing of the previous dialog, with an indicator (e.g., a flag) representing the dialog has ended. In at least some examples, a dialog may end based on the natural language processing system 120 sending a directive to a device 110, with the directive instructing the device 110 to output data (e.g., requested music, synthesized speech representing an airline ticket has been purchased, etc.) to the user.

Another way of determining the end of a dialog may include looking at intents of user inputs. A dialog may include one or more user inputs corresponding to the same intent. For example, a dialog may include one or more user and device turns that relate to a <BookFlight> intent. At some point, the natural language processing system 120 may receive a user input (corresponding to a device turn from a same device 110 through which the foregoing dialog was performed) corresponding to an intent different from the <BookFlight> intent. The natural language processing system 120's determination that the user input corresponds to a different intent than the <BookFlight> intent may effectively determine that the dialog, relating to the <BookFlight> intent, has ended. As a result, the natural language processing system 120 may assign a new dialog identifier to the most-recently received user input.

Another way of determining the end of a dialog may include looking at context used to perform an action. In the aforementioned multi-turn dialog having the goal of booking a flight, performing the action of booking the flight included looking to context (e.g., substantive content) of previous turns of the dialog. After the last device turn of the foregoing dialog, the natural language processing system 120 may receive a user input (e.g., requesting the output of music), and the processing of this user input may not require context of the turns of the previous dialog (e.g., substantive content used to book the flight) to perform an action responsive to the user input. In this situation, the natural language processing system 120 may determine the dialog, with the goal of booking the flight, has ended based on context of that dialog not being relevant to processing of a present user input received from the same device 110 that performed the dialog.

After the natural language processing system 120 determines the first dialog has ended, the natural language processing system 120 may generate (154) a first score representing a conversational quality of the first dialog (as described in detail herein below).

The skill system 125 may perform processing with respect to one or more device turns of the first dialog. At some point after the first dialog has ended, the natural language processing system 120 may receive (156), from the skill system 125, altered data for use in runtime processing. Alternatively, the natural language processing system 120 may simply receive, from the skill system 125, an indicator that runtime processing of the skill system 125 has been altered. For example, a skill developer may alter, through a skill developer interface, data that may be used by the skill system 125 at runtime to perform one or more actions responsive to one or more user inputs.

Sometime after the skill system 125 data has been altered, the natural language processing system 120 may receive (158) various users inputs relating to a second goal (e.g., corresponding to second dialog). The natural language processing system 120 may invoke the skill system 125 to perform processing with respect to one or more device turns of the second dialog. At some point, the natural language processing system 120 may determine (160) the second dialog has ended. The natural language processing system 120 determine such using one or more techniques as described above with respect to determining the first dialog has ended.

After the natural language processing system 120 determines the second dialog has ended, the natural language processing system 120 may generate (162) a second score representing a conversational quality of the second dialog (as described in detail herein below). The natural language processing system 120 may send (164), to the skill system 125, the first and second scores. Alternatively, the natural language processing system 120 may send, to the skill system 125, data representing a difference of the scores. Such data may represent the second score is greater than the first score (and optionally may include a value representing the deviation between the first and second scores), may represent the second score is lower than the first score (and optionally may include a value representing the deviation between the first and second scores), etc. The value representing the deviation may be a numeric value or a categorical value (e.g., small, medium, large). The skill system 125 (and more particularly a skill developer of the skill system 125) may use the scores or other data received at step 164 to assess whether the altered data created a more beneficial user experience and, based thereon, assess whether the skill system 125 data should be further altered.

As described above with respect to FIG. 1, a dialog may invoke processing of a single skill system. In some examples, a dialog may invoke processing of more than one skill system. For example, a dialog relating to a goal of booking a flight may include invoking an airline skill system to find and book the flight, as well as may include invoking a credit card skill system to authorize payment for the booked flight.

Figure 2:
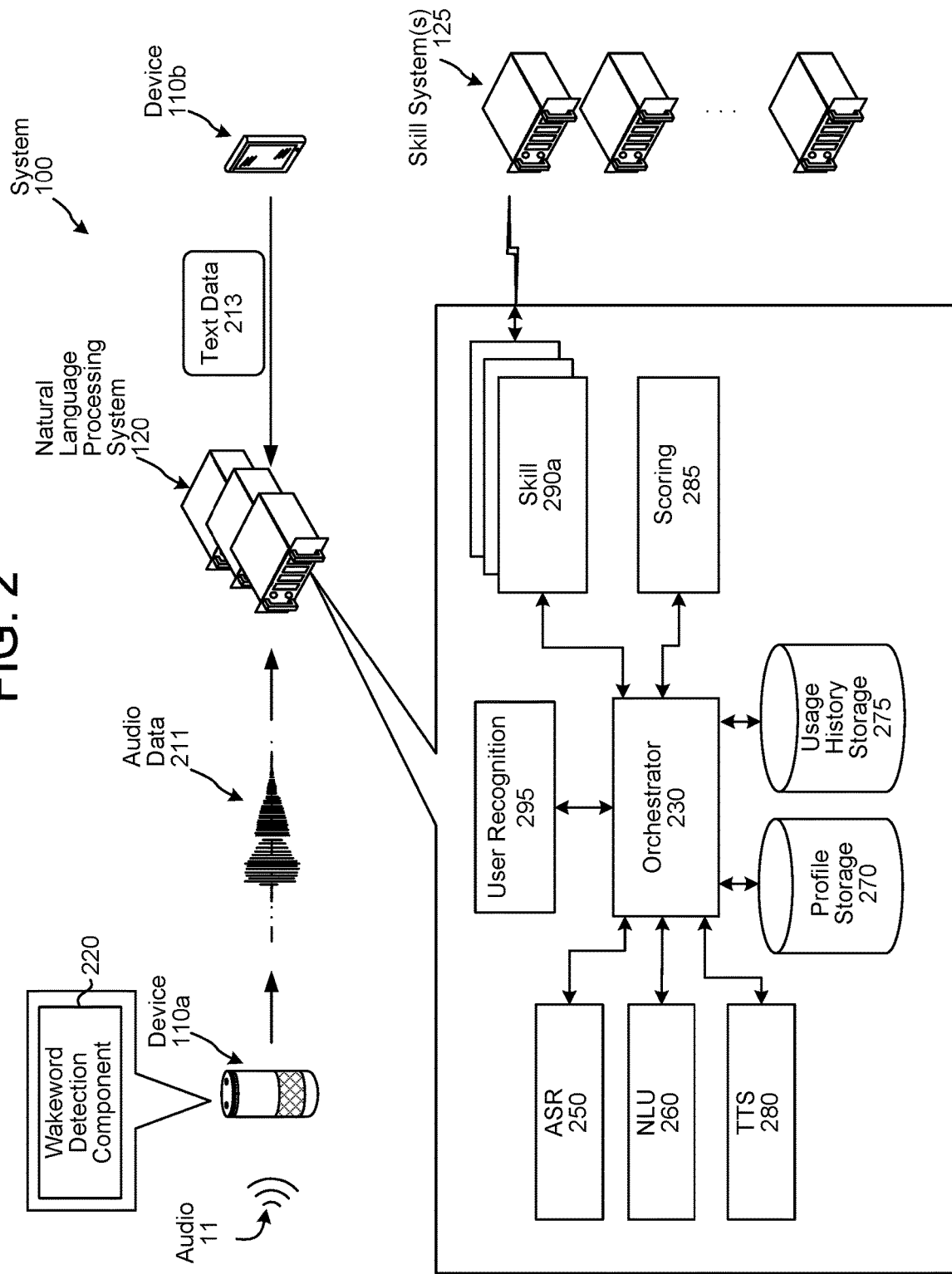
FIG. 2 is a conceptual diagram of components of a system, in accordance with embodiments of the present disclosure.

Further details of the system 100 configured to score dialogs are explained below, following a discussion of the overall system 100 of FIG. 2. The various components may be located on same or different physical devices. Communication between various components may occur directly or across a network(s) 199.

An audio capture component(s), such as a microphone or array of microphones of the device 110*a*, captures audio 11. The device 110*a* processes audio data, representing the audio 11, to determine whether speech is detected. The device 110*a* may use various techniques to determine whether audio data includes speech. In some examples, the device 110*a* may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110*a* may implement a limited classifier configured to distinguish speech from background noise. The classifier may be implemented by techniques such as linear classifiers, support vector machines, and decision trees. In still other examples, the device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110*a* may use a wakeword detection component 220 to perform wakeword detection to determine when a user intends to speak an input to the natural language processing system 120. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110*a* may "wake" and begin transmitting audio data 211, representing the audio 11, to the natural language processing system 120. The audio data 211 may include data corresponding to the wakeword, or the device 110*a* may remove the portion of the audio corresponding to the wakeword prior to sending the audio data 211 to the natural language processing system 120.

An orchestrator component 230 may receive the audio data 211. The orchestrator component 230 may include memory and logic that enables the orchestrator component 230 to transmit various pieces and forms of data to various components of the system 100, as well as perform other operations.

The orchestrator component 230 sends the audio data 211 to an ASR component 250. The ASR component 250 transcribes the audio data 211 into text data. The text data output by the ASR component 250 represents one or more than one (e.g., in the form of an n-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The text data output by the ASR component 250 may include a top scoring ASR hypothesis or may include an n-best list of ASR hypotheses. Each ASR hypothesis may be associated with a respective score. Each score may indicate a confidence of ASR processing performed to generate the ASR hypothesis with which the score is associated.

The device 110*b* may receive a text-based user input. The device 110*b* may generate text data 213 representing the text-based user input. The device 110*a* may send the text data 213 to the natural language processing system 120. The orchestrator component 230 may receive the text data 213.

The orchestrator component 230 may send text data (e.g., text data output by the ASR component 250 or the received text data 213) to an NLU component 260.

The NLU component 260 attempts to make a semantic interpretation of the natural language phrase(s) or statement(s) represented in the received text data. That is, the NLU component 260 determines one or more meanings associated with the natural language phrase(s) or statement(s) represented in the text data based on words represented in the text data. The NLU component 260 determines an intent representing an action that a user desires be performed as well as pieces of the text data that allow a device (e.g., the device 110, the natural language processing system 120, a skill 290, a skill system(s) 125, etc.) to execute the intent. For example, if the text data corresponds to "play Adele music," the NLU component 260 may determine an intent that the natural language processing system 120 output music and may identify "Adele" as an artist. For further example, if the text data corresponds to "what is the weather," the NLU component 260 may determine an intent that the natural language processing system 120 output weather information associated with a geographic location of the device 110. In another example, if the text data corresponds to "turn off the lights," the NLU component 260 may determine an intent that the natural language processing system 120 turn off lights associated with the device(s) 110 or the user(s) 5. The NLU component 260 may output NLU results data (which may include tagged text data, indicators of intent, etc.).

As described above, the natural language processing system 120 may perform speech processing using two different components (e.g., the ASR component 250 and the NLU component 260). One skilled in the art will appreciate that the natural language processing system 120, in at least some examples, may implement a spoken language understanding (SLU) component that is configured to process audio data 211 to generate NLU results data.

In some examples, the SLU component may be equivalent to the ASR component 250 and the NLU component 260. For example, the SLU component may process audio data 211 and generate NLU data. The NLU data may include intent data and/or slot data so that directives may be determined based on the intent data and/or the slot data. While the SLU component may be equivalent to a combination of the ASR component 250 and the NLU component 260, the SLU component may process audio data 211 and directly generate the NLU data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user 5 in order to derive an intent or a desired action or operation. In some examples, the SLU component outputs a most likely NLU response (e.g., hypothesis) recognized in the audio data 211, or multiple hypotheses in the form of a lattice or an N-best list with individual hypotheses corresponding to confidence scores or other scores (such as probability scores, etc.).

The natural language processing system 120 may include one or more skills 290. For example, a weather service skill may enable the natural language processing system 120 to output weather information, a car service skill may enable the natural language processing system 120 to book a trip with respect to a taxi or ride sharing service, a restaurant skill may enable the natural language processing system 120 to order a pizza with respect to the restaurant's online ordering system, etc. A skill 290 may operate in conjunction between the natural language processing system 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the natural language processing system 120, a skill 290 may be implemented by a skill system 125. Such may enable a skill system 125 to execute specific functionality in order to provide data or perform some other action requested by a user.

Skills may be associated with different domains, such as smart home, music, video, flash briefing, shopping, and custom (e.g., skills not associated with any pre-configured domain).

The natural language processing system 120 may be configured with a single skill 290 dedicated to interacting with more than one skill system 125.

The natural language processing system 120 may include a TTS component 280. The TTS component 280 may generate audio data (e.g., synthesized speech) from text data using one or more different methods. Text data input to the TTS component 280 may come from a skill 290, the orchestrator component 230, or another component of the natural language processing system 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 120 may include a user recognition component 295. In at least some examples, the user recognition component 295 may be implemented as a skill 290, or as part of a skill system 125.

The user recognition component 295 may recognize one or more users using a variety of data. The user recognition component 295 may take as input the audio data 211 and/or the text data 213. The user recognition component 295 may perform user recognition by comparing speech characteristics, in the audio data 211, to stored speech characteristics of users. The user recognition component 295 may additionally or alternatively perform user recognition by comparing biometric data (e.g., fingerprint data, iris data, etc.), received by the natural language processing system(s) 120 in correlation with a user input, to stored biometric data of users. The user recognition component 295 may additionally or alternatively perform user recognition by comparing image data (e.g., including a representation of at least a feature of a user), received by the natural language processing system(s) 120 in correlation with a user input, with stored image data including representations of features of different users. The user recognition component 295 may perform other or additional user recognition processes, including those known in the art. For a particular user input, the user recognition component 295 may perform processing with respect to stored data of users associated with the device 110 that captured the user input.

The user recognition component 295 determines whether a user input originated from a particular user. For example, the user recognition component 295 may generate a first value representing a likelihood that a user input originated from a first user, a second value representing a likelihood that the user input originated from a second user, etc. The user recognition component 295 may also determine an overall confidence regarding the accuracy of user recognition operations.

The user recognition component 295 may output a single user identifier corresponding to the most likely user that originated the user input. Alternatively, the user recognition component 295 may output multiple user identifiers (e.g., in the form of an N-best list) with respective values representing likelihoods of respective users originating the user input. The output of the user recognition component 295 may be used to inform NLU processing, processing performed by a skill 290 or skill system 125, as well as processing performed by other components of the natural language processing system(s) 120 and/or other systems.

The natural language processing system 120 may include profile storage 270. The profile storage 270 may include a variety of information related to individual users, groups of users, devices, etc. that interact with the natural language processing system 120. As used herein, a "profile" refers to a set of data associated with a user, group of users, device, etc. The data of a profile may include preferences specific to the user, group of users, device, etc.; input and output capabilities of one or more devices; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skills that the user has enabled. When a user enables a skill, the user is providing the natural language processing system 120 with permission to allow the skill to execute with respect to the user's inputs. If a user does not enable a skill, the natural language processing system 120 may not permit the skill to execute with respect to the user's inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

Figure 3:
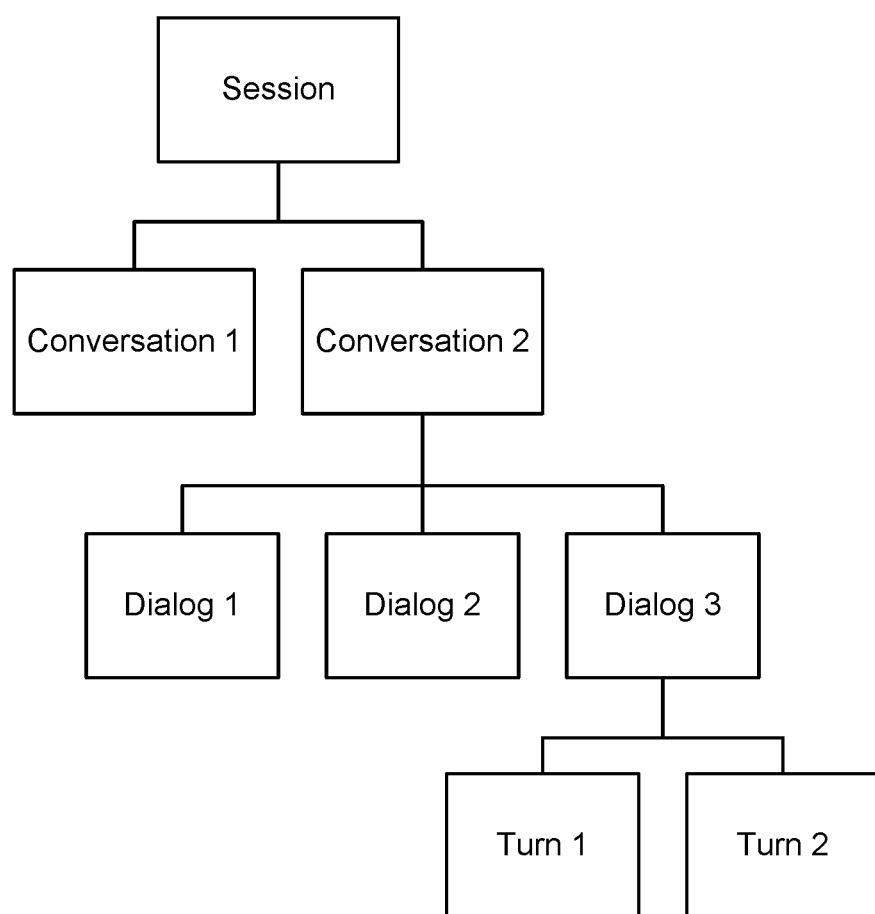
FIG. 3 is a conceptual diagram of a usage history storage, in accordance with embodiments of the present disclosure.

The natural language processing system 120 may include a usage history storage 275. FIG. 3 conceptually illustrates how data may be stored in the user history storage 275. Data corresponding to a turn (either a user turn or a device turn) may be associated with a turn identifier. For example, as illustrated in FIG. 3, "Turn 1" may be associated with a first turn identifier and "Turn 2" may be associated with a second turn identifier.

A turn identifier may be associated with various data. For example, a user turn identifier may be associated with audio data corresponding to a user input of the turn (e.g., when the user input is spoken), text data representing the user input (e.g., when the user input is typed), a device identifier representing the device 110 that captured the user input, a timestamp representing when the device 110 captured the user input, and/or other data. For further example, a device turn identifier may be associated with ASR results data, NLU results data, a skill identifier representing a skill 290 that was invoked to process with respect to a corresponding user input, a user identifier output by the user recognition component 295 in relation to the corresponding user input, and/or other data.

Data corresponding to a dialog may be associated with a dialog identifier. For example, as illustrated in FIG. 3, "Dialog 1" may be associated with a first dialog identifier, "Dialog 2" may be associated with a second dialog identifier, and "Dialog 3" may be associated with a third dialog identifier. Each dialog identifier may be associated with one or more turn identifiers. For example, as illustrated in FIG. 3, the third dialog identifier could be associated with the first turn identifier and the second turn identifier. While not illustrated, each of the first and second dialog identifiers could be associated with one or more turn identifiers.

The user history storage 275 may store data relating to one or more conversations. As used herein, a "conversation" may refer to a set of overlapping dialogues about a same topic between a device and one or more users. An example of a conversation includes a user interacting with the natural language processing system 120 (through user turns and corresponding device turns) about a singer that includes one or more dialogs asking about the singer, and one or more dialogs requesting the output of music sung by the singer. Another example of a conversation includes a user interacting with the natural language processing system 120 (through user turns and corresponding device turns) to prepare for a party, in which dialogs of the conversation include one or more dialogs whereby a user orders ingredients for a meal, and one or more dialogs whereby a user creates a music playlist.

Data corresponding to a conversation may be associated with a conversation identifier. For example, as illustrated in FIG. 3, "Conversation 1" may be associated with a first conversation identifier and "Conversation 2" may be associated with a second conversation identifier. Each conversation identifier may be associated with one or more dialog identifiers. For example, as illustrated in FIG. 3, the second conversation identifier may be associated with the first dialog identifier, the second dialog identifier, and the third dialog identifier. While not illustrated, the first conversation identifier may be associated with one or more dialog identifiers.

The usage history storage 275 may store data relating to one or more sessions. As used herein, a "session" may refer to a set of one or more conversations with inactivity boundaries and with a condition that there is at least one common user between any two consecutive conversations in the set. Thus, a session may include a set of consecutive conversations that have no more than a threshold amount of time between each conversation. Once the threshold amount of time occurs between consecutive conversations, the former conversation of the consecutive conversations marks an end of a first session and the latter conversation of the consecutive conversations marks a beginning of a second session. The threshold amount of time may be configurable. In at least some examples, the threshold amount of time may be 1 minute, 2 minutes, or 5 minutes. Thus, a session may transpire over any length of time, provided the amount of time between conversations does not meet or exceed the threshold amount of time.

The system may be configured to incorporate user permissions and may only perform activities and store data disclosed herein if approved by a user. As such, the systems, devices, components, and techniques described herein would be typically configured to restrict processing and storage of data where appropriate and only process user information and store data in a manner that ensures compliance with all appropriate laws, regulations, standards, and the like. The system and techniques can be implemented on a geographic basis to ensure compliance with laws in various jurisdictions and entities in which the components of the system and/or user are located.

The natural language processing system 120 may include a scoring component 285 configured to score turns, dialogs, conversations, and sessions. As illustrated in FIG. 2, the scoring component 285 may be implemented as a distinct component within the natural language processing system 120. Nonetheless, one skilled in the art will appreciate that the scoring component 285 may be implemented in various manners. For example, in at least some natural language processing systems, the scoring component 285 may be implemented as part of the orchestrator component 230.

Scores, generated by components of the scoring component 285, may be numeric scores (e.g., on a scale of 0-1 or some other scale) or categorical scores (e.g., low, medium, high; small, medium, large; natural, not natural; relevant, not relevant; etc.)

Figure 4:
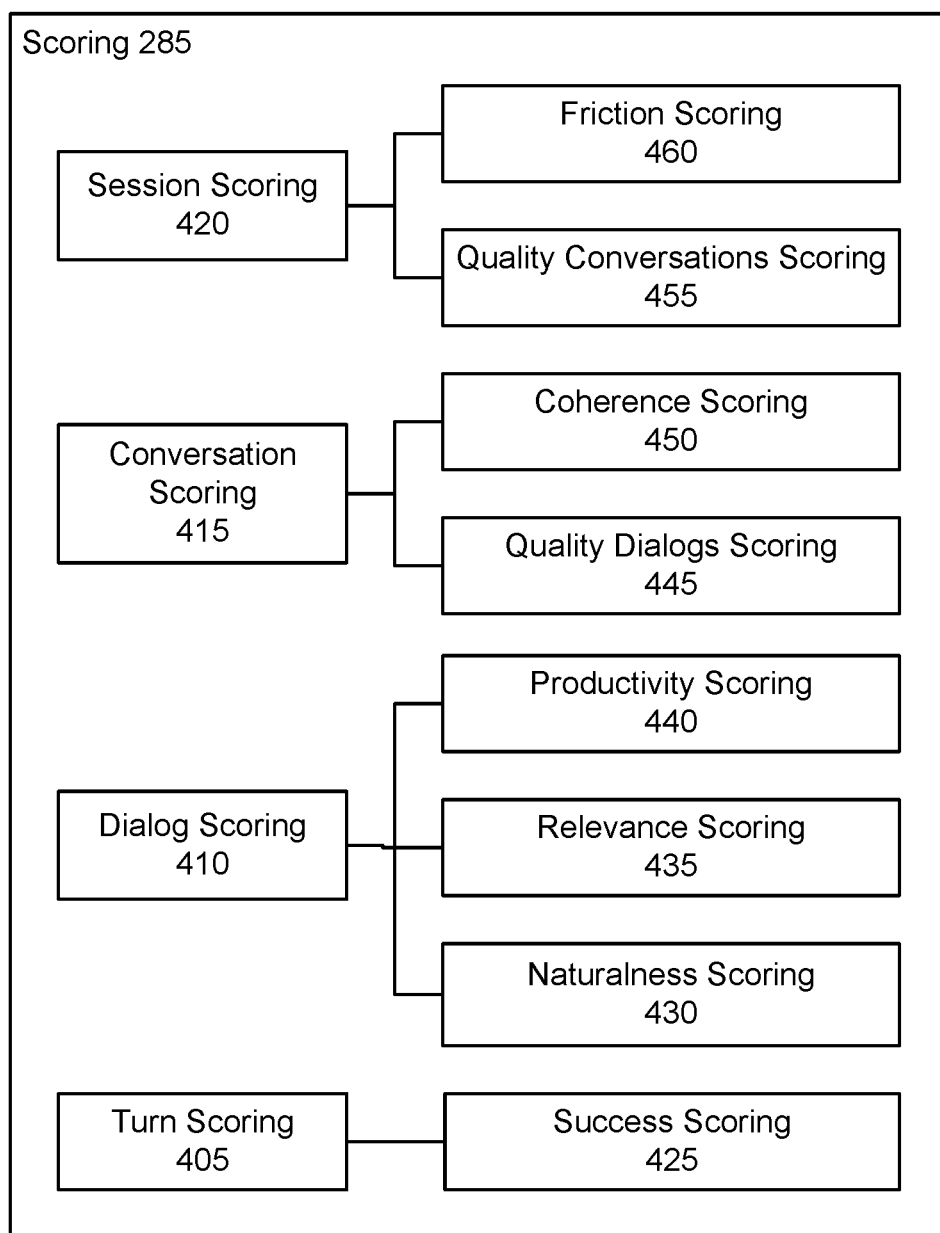
FIG. 4 is a conceptual diagram of components of a scoring component, in accordance with embodiments of the present disclosure.

As illustrated in FIG. 4, the scoring component 285 may include a turn scoring component 405 configured to score individual turns, a dialog scoring component 410 configured to score individual dialogs, a conversation scoring component 415 configured to score individual conversations, and a session scoring component 420 configured to score individual sessions.

The turn scoring component 405 may include a success scoring component 425. The dialog scoring component 410 may include a naturalness scoring component 430, an relevance scoring component 435, and a productivity scoring component 440. The conversation scoring component 415 may include a quality dialogs scoring component 445 and a coherence scoring component 450. The session scoring component 420 may include a quality conversations scoring component 455 and a friction scoring component 460. Processes of these scoring components are described in detail below.

One or more of the subcomponents of the scoring component 285 may implement one or more trained machine learning models. Various machine learning techniques may be used to train such model(s). Models may be trained and operated according to various machine learning techniques. Such techniques may include, for example, inference engines, trained classifiers, etc. Examples of trained classifiers include conditional random fields (CRF) classifiers, Support Vector Machines (SVMs), neural networks (such as deep neural networks and/or recurrent neural networks), decision trees, AdaBoost (short for "Adaptive Boosting") combined with decision trees, and random forests. Focusing on CRF as an example, CRF is a class of statistical models used for structured predictions. In particular, CRFs are a type of discriminative undirected probabilistic graphical models. A CRF can predict a class label for a sample while taking into account contextual information for the sample. CRFs may be used to encode known relationships between observations and construct consistent interpretations. A CRF model may thus be used to label or parse certain sequential data, like query text as described above. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. For example, known types for previous queries may be used as ground truth data for the training set used to train the various components/models. Various techniques may be used to train the models including backpropagation, statistical learning, supervised learning, semi-supervised learning, stochastic learning, stochastic gradient descent, or other known techniques. Thus, many different training examples may be used to train the classifier(s)/model(s) discussed herein. Further, as training data is added to, or otherwise changed, new classifiers/models may be trained to update the classifiers/models as desired.

The success scoring component 425, of the turn scoring component 405, may compute estimated turn error rate (ETER) scores, with each ETER score representing a likelihood that a device turn failed to successfully respond to a corresponding, previous user turn. An ETER score may be determined, by the success scoring component 425, without user transcription, annotation, and/or dialog success rate (DSR) analysis (described in detail below). A model may be trained to computer ETER scores using data associated with previous other turns and dialogs performed by the natural language processing system 120. Such data may include, for example, ASR confidences, dialog statuses, whether a next turn in a dialog corresponded to a <Cancel> intent or a <Feedback> intent, whether a user input was short or long, whether an intent is "simple" or includes one or more slots (corresponding to entities), etc.

Figure 5:
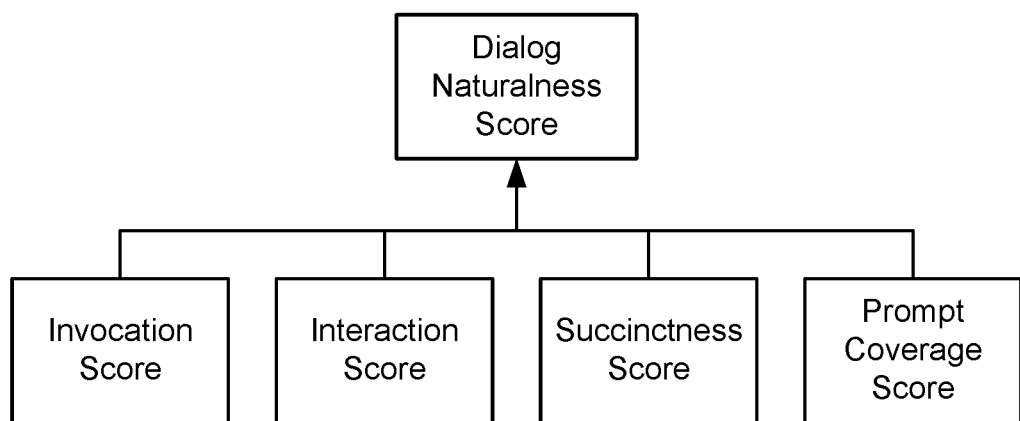
FIG. 5 is a conceptual diagram of scores generated by a naturalness scoring component, in accordance with embodiments of the present disclosure.

The naturalness scoring component 430, of the dialog scoring component 410, may generate invocation scores, interaction scores, succinctness scores, and prompt coverage scores (as illustrated in FIG. 5). Invocation, interaction, succinctness, and prompt coverage scores may collectively be used to measure an ability to allow users to interact with the natural language processing system 120 and skill systems 125 using natural language (e.g., without specialized user input structures, specialized syntax, or technical jargon).

An invocation score may represent a degree to which skills were invoked without corresponding user inputs including structured skill names or invocation phrases. A first user turn of a dialog may correspond to an invocation of a skill, while second and later user turns of the same dialog may, in some examples, provide further information for the skill to process the intent of the first user turn. The naturalness scoring component 430 may determine whether, for a dialog, a user input to invoke a skill starts with the word "open," "ask," "launch," or some other like word that explicitly indicates a skill is to be invoked. If the naturalness scoring component 430 determines the user input starts with such a word, the naturalness scoring component 430 may assign a first invocation score (e.g., 0) to the dialog. If, instead, the naturalness scoring component 430 determines the user input does not start with a word that explicitly indicates a skill is to be invoked, the naturalness scoring component 430 may determine whether the user input includes a skill name. If the naturalness scoring component 430 determines the user input includes a skill name, the naturalness scoring component 430 may assign the first invocation score (e.g., 0) to the dialog. If, instead, the naturalness scoring component 430 determines the user input does not include a skill name, the naturalness scoring component 430 may assign a second invocation score (e.g., 1) to the dialog. While invocation scores of 0 and 1 are discussed, one skilled in the art will appreciate that other invocation scores may be generated by the naturalness scoring component 430.

In at least some examples, the invocation scores, generated by the naturalness scoring component 430 may not be binary. In such examples, the naturalness scoring component 430 also consider whether a skill was invoked in response to a first user turn of a dialog. The following illustrates example invocation scores and corresponding criteria:

- 0—first user input of dialog started with "open," "ask," "launch," or the like AND the first user input included a skill name BUT a skill (corresponding to the skill name) was not invoked;
- 0.25—the first user input started with "open," "ask," "launch," or the like AND a skill was invoked;
- 0.5— the first user input started with "open," "ask," "launch," or the like AND the first user input included a skill name AND a skill (corresponding to the skill name) was invoked;
- 0.75—the first user input corresponds to a <Question&Answer> intent AND NLU entity resolution results to a particular skill name; and
- 1—none of the above criteria were satisfied.

As described above, the naturalness scoring component 430 may also generate interactions scores. An interaction score may represent a degree to which an intent(s) of the dialog could be understood by the natural language processing system 120 without user inputs being required to include pre-structured commands or phrases. The naturalness scoring component 430 may assign a respective interactions score to each turn pair, including a user turn and a corresponding device turn, of a dialog An interaction score may represent whether, once a skill has been invoked for a dialog, the intent of the skill-invoking user input of the dialog was able to be processed in view of one or more subsequent natural language user inputs, or whether the one or more subsequent user inputs were required confirm to one or more pre-structured commands or phrases. The naturalness scoring component 430 may identify such based on whether a user input of a dialog, not corresponding to a skill-invoking user input, was required to be rephrased. If the naturalness scoring component 430 determines a device turn of a dialog required a user to rephrase a user input of a user turn of the turn pair, the naturalness scoring component 430 may assign a first interaction score (e.g., 0) to that turn pair. If the naturalness scoring component 430 determines a device turn of a dialog did not require a user to rephrase a user input of a user turn of the turn pair, the naturalness scoring component 430 may assign a second interaction score (e.g., 1) to that turn pair. While interactions scores of 0 and 1 are discussed, one skilled in the art will appreciate that other interactions scores may be generated by the naturalness scoring component 430.

Because the naturalness scoring component 430 may compute an interaction score for each turn pair of a dialog, the naturalness scoring component 430 may compute more than one interaction score for a single multi-turn dialog. In such a scenario, the naturalness scoring component 430 may generate an aggregated interaction score. In an example, the naturalness scoring component 430 may compute an aggregated interaction score for a dialog by calculating an average across the individual interaction scores of the dialog, although it will be appreciated that other aggregation techniques are also possible.

The naturalness scoring component 430 may additionally or alternatively generate succinctness scores. A succinctness score may represent whether data, generated by the natural language processing system 120 and/or skill system 125 for output to a user during a dialog, was appropriately verbose or succinct while also being complete. The naturalness scoring component 430 may generate a succinctness score for each device turn of a dialog. A succinctness score may be a binary (e.g., 0 or 1, or some other binary scale) or non-binary value depending on implementation.

Because the naturalness scoring component 430 may compute a succinctness score for each device turn of a dialog, the naturalness scoring component 430 may compute more than one succinctness score for a single multi-turn dialog. In such a scenario, the naturalness scoring component 430 may generate an aggregated succinctness score. In an example, the naturalness scoring component 430 may compute an aggregated succinctness score for a dialog by calculating an average across the individual succinctness scores of the dialog, although it will be appreciated that other aggregation techniques are also possible.

The naturalness scoring component 430 may additionally or alternatively generate a prompt coverage score. A prompt coverage score may represent a degree to which data, generated by the natural language processing system 120 and/or skill system 125 for output to a user during a dialog, was non-repetitive and non-monotonous, or was repetitive and monotonous depending on how the naturalness scoring component 430 is configured. The naturalness scoring component 430 may, in at least some examples, using the following computation to determine a prompt coverage score on a device turn basis:

$$\frac{\text{\# of prompt message variants supplied}}{\text{\# of all supported prompt variants for that prompt}}$$

Thus, for example, an error prompt with 2 possible variants may correspond to a prompt coverage score of 0.5.

The naturalness scoring component 430 may output a dialog naturalness score. The naturalness scoring component 430 may compute the dialog naturalness score using different approaches depending upon implementation. In at least some examples, the naturalness scoring component 430 may compute the dialog naturalness score as:

$$\frac{\text{sum of individual scores calculated by the naturalness scoring component}}{\text{the number of individual scores calculated by the naturalness scoring component}}$$

Using the above description with respect to the naturalness scoring component 430's processing, the naturalness scoring component 430 may compute the dialog naturalness score as:

$$\frac{\text{invocation score} + \text{aggregate interaction score} + \text{succinctness score} + \text{prompt coverage score}}{4}$$

One or more of the individual values, in the foregoing calculation, may be associated with a respective weight. In such examples, a value may be multiplied by its respective weight, and the resulting weighted value may be used in the foregoing dialog naturalness score calculation. In at least some examples a weight applied to a value may be domain dependent (e.g., based on the domain corresponding to the dialog, conversation, session, etc.).

Figure 6:
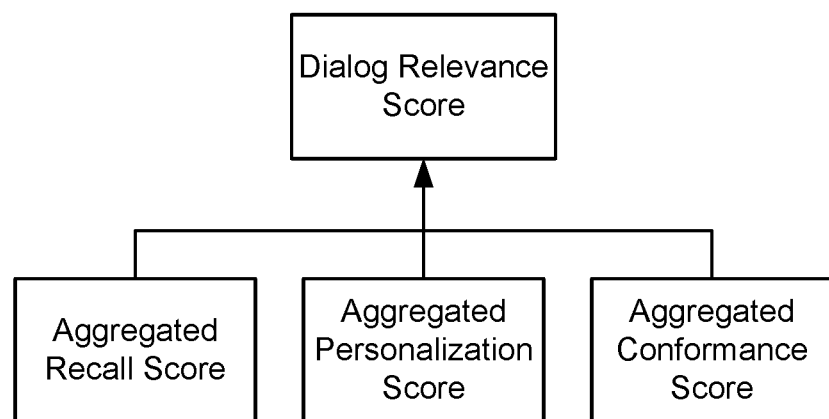
FIG. 6 is a conceptual diagram of scores generated by a relevance scoring component, in accordance with embodiments of the present disclosure.

The relevance scoring component 435, of the dialog scoring component 410, may generate recall scores, personalization scores, and conformance scores (as illustrated in FIG. 6). Recall, personalization, and conformance scores may collectively be used to measure a level of relevance of an n turn dialog to the user.

A recall score may represent a measure of the natural language processing system 120's and/or skill system 125's derivation of appropriate understanding or response per current and previous dialog context. The relevance scoring component 435 may generate recall scores on a device turn basis. A recall score may be a binary score (e.g., 0 or 1, or some other binary scale), or a non-binary score based on implementation. For example, one recall score may be assigned for device turns corresponding to output data that is not generated based on current and/or previous context of the dialog, whereas a second recall score may be assigned for device turns corresponding to output data that is generated based on current and/or previous context of the dialog. Consider the following dialog as an example. For illustration, it may be assumed that the device 110, through which the dialog is performed, may be associated with a geographic location of Seattle, Wash. (e.g., in a device profile corresponding to the device 110).

User turn: "Alexa, what is the weather today?"
Device turn: "In Seattle, Wash., it's cloudy at 43 degrees."
User turn: "Alexa, how about tomorrow in Boston?"
Device turn: "Sorry, I don't know that."

In the above example, the first device turn may receive a null value with respect to recall scores because there is no previous dialog context, other than the first user turn, from which to base output data of the first device turn on. The second device turn of the foregoing illustrative dialog may be assigned a recall score (e.g., 0) based on the output data of the second device turn not being generated in view of the first user turn. Had the output data of the second device turn been generated in view of the first user turn, the second device turn of the foregoing illustrative dialog may have corresponded to "tomorrow in Boston, it's 30 degrees with a 60% chance of snow," resulting in a second recall score (e.g., 1).

Because the relevance scoring component 435 may compute recall scores at a device turn level, the relevance scoring component 435 may compute more than one recall score for a single multi-turn dialog. In such a scenario, the relevance scoring component 435 may generate an aggregated recall score. In an example, the relevance scoring component 435 may compute an aggregated recall score for a dialog by calculating an average across the individual recall scores of the dialog, although it will be appreciated that other aggregation techniques are also possible.

A personalization score may represent a measure of the natural language processing system 120's and/or skill system 125's derivation of appropriate understanding or response per explicit user interests, implicit user interests, and/or profile data. The relevance scoring component 435 may generate personalization scores on a device turn basis. A personalization score may be a binary score (e.g., 0 or 1, or some other binary scale) or a non-binary score based on implementation. For example, one personalization score may be assigned for device turns corresponding to output data that is not generated based on explicit user interests, implicit user interests, and/or profile data, whereas a second personalization score may be assigned for device turns corresponding to output data that is generated based on explicit user interests, implicit user interests, and/or profile data. Consider the following dialog as an example. For illustration, it may be assumed that the device 110, through which the dialog is performed, may be associated with a geographic location of Seattle, Wash. (e.g., in a device profile corresponding to the device 110).

User turn: "Alexa, what is the weather today?"
Device turn: "In Seattle, Wash., it's cloudy at 43 degrees."

In the above example, the device turn may receive a personalization score (e.g., 1) because based on the output data of the device turn being generated in view of the profile data representing the device 110 is associated with Seattle, Wash. In the following illustrative dialog, the device turn may be assigned a different personalization score (e.g., 0) based on the output data of the device turn not being generated in view of the profile data.

User turn: "Alexa, what is the weather today?"
Device turn: "What location's weather would you like?"

Because the relevance scoring component 435 may compute personalization scores at a device turn level, the relevance scoring component 435 may compute more than one personalization score for a single multi-turn dialog. In such a scenario, the relevance scoring component 435 may generate an aggregated personalization score. In an example, the relevance scoring component 435 may compute an aggregated personalization score for a dialog by calculating an average across the individual personalization scores of the dialog, although it will be appreciated that other aggregation techniques are also possible.

A conformance score may represent a measure of conformance of natural language processing system 120 and/or skill system 125 output data to one or more policies. As used herein, a "policy" may refer to one or more concepts, imposed by the natural language processing system 120, that skills and skill systems are expected to comply with. For example, the one or more policies, from which a conformance score may be generated, may include one or more age appropriateness policies (e.g., representing types of content that are appropriate for output to users of certain ages), one or more fairness against biases policies (e.g., representing content biases that should be avoided by a skill or skill system when determining content for output to users), one or more profanity filtering policies (e.g., representing situations when profanity is or is not allowed to be output to users), etc. The relevance scoring component 435 may generate conformance scores on a device turn basis.

The relevance scoring component 435 may generate, in at least some examples, 3 individual conformance scores for a single device turn. A first conformance score for a device turn may be generated based on whether the output data of the device turn was appropriate for the user's age (e.g., as represented in a user profile corresponding to the user). For example, a child may provide the user input "Alexa, Play ABCD." A first score (e.g., 1) may be assigned if the output data corresponds to a ABCD nursery rhyme, whereas a second score (e.g., 0) may be assigned if the output data corresponds to an R-rated movie and/or the movie's soundtrack.

A second conformance score for a device turn may be generated based on whether the output data of the device turn included profanity or not. For example, a first score (e.g., 1) may be assigned if the output data does not include profanity, whereas a second score (e.g., 0) may be assigned if the output data included profanity.

A third conformance score for a device turn may be generated based on whether the output data of the device turn was normalized against known biases or not. For example, a user may provide the user input "Alexa, tell me a joke." A first score (e.g., 0) may be assigned if the output data corresponds to a joke with racist bias, whereas a joke without racist bias may be assigned a second score (e.g., 1).

When the relevance scoring component 435 computes multiple (e.g., 3) conformance scores for each device turn, the relevance scoring component 435 may compute an aggregated conformance score for each device turn. In an example, the relevance scoring component 435 may compute an aggregated device turn level conformance score by calculating an average across the individual conformance scores of the device turn, although it will be appreciated that other aggregation techniques are also possible.

Because the relevance scoring component 435 may compute aggregated or non-aggregated conformance scores at a device turn level, the relevance scoring component 435 may compute more than one conformance score for a single multi-turn dialog. In such a scenario, the relevance scoring component 435 may compute an aggregated conformance score for a dialog by calculating an average across the individual device turn level aggregated or non-aggregated conformance scores of the dialog, although it will be appreciated that other aggregation techniques are also possible.

The relevance scoring component 435 may output a dialog relevance score. The relevance scoring component 435 may compute the dialog relevance score using different approaches depending upon implementation. In at least some examples, the relevance scoring component 435 may compute the dialog relevance score as:

$$\frac{\text{sum of individual scores calculated by the appropriateness scoring component}}{\text{the number of individual scores calculated by the appropriateness scoring component}}$$

Using the above description with respect to the relevance scoring component 435's processing, the relevance scoring component 435 may compute the dialog relevance score as:

$$\frac{\text{aggregated recall score + aggregate personalization score + aggregated dialog conformance score}}{3}$$

Figure 7:
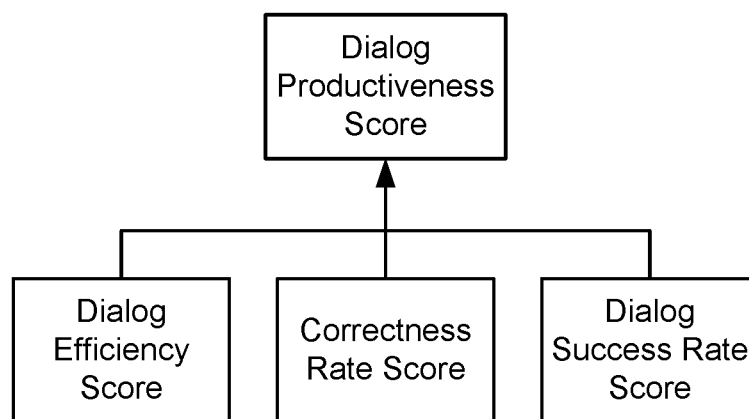
FIG. 7 is a conceptual diagram of scores generated by a productivity scoring component, in accordance with embodiments of the present disclosure.

The productivity scoring component 440, of the dialog scoring component 410, may generate dialog efficiency scores, correctness rate scores, and dialog success rate (DSR) scores (as illustrated in FIG. 7). Dialog efficiency, correctness rate, and DSR scores may collectively be used to measure how accurate, correct, and efficient a dialog was.

A dialog efficiency score may represent whether the dialog included a least number of turns to achieve the dialog goal (e.g., a binary dialog efficiency score) and/or how close to a least number of turns the dialog was (e.g., a non-binary dialog efficiency score). In at least some examples, the productivity scoring component 440 may compute a dialog efficiency score, at a dialog level rather than on a turn basis, as follows:

$$\frac{\text{average number of turns for the dialog goal}}{\text{number of turns in the dialog}}$$

The average number of turns for the dialog goal may be measured by taking an average of the number of turns, of dialogs performed by various users of the system, to perform the dialog goal (e.g., grouping numbers of turns from previous dialogs corresponding to a particular intent, from previous dialogs corresponding to a particular intent as performed by a particular skill, etc.). In at least some other examples, the productivity scoring component 440 may compute a dialog efficiency score as follows:

$$\frac{\text{minimum number of turns needed for the dialog goal}}{\text{number of turns in the dialog}}$$

The minimum number of turns needed for the dialog goal may be provided by a skill developer, who's skill is configured to perform the goal. In such a case, the minimum number of turns may be a hypothetical minimum number of turns. In at least some other examples, the productivity scoring component 440 may compute a dialog efficiency score of dialog d with intent i as follows:
1. Start with $D_i$ the set of all successful dialogs of intent i in a sample period (e.g., one month);
2. Compute $_nT_{best\text{-}case}$=MIN(number of turns of any successful dialog in the set $D_i$);
3. Compute $_nT_d$=number of turns of current dialog d; and
4. Dialog efficiency score=$_nT_{best\text{-}case}/_nT_d$.
If $(_nT_{best\text{-}case}<_nT_d)$ $(_nT_{best\text{-}case}$=NULL) then replace $_nT_{best\text{-}case}$ with $_nT_d$. The foregoing is an example of a linear time algorithm that may be used by the productivity scoring component 440 to compute a dialog efficiency score. "Turns," as used in the foregoing dialog efficiency score calculations, may refer to a pair of corresponding user and device turns, rather than individual user turns or device turns. For example, the below illustrative dialog may correspond to 3 turns (whereby each turn starts with a user turn and ends with a next device turn of the dialog) for purposes of dialog efficiency score calculations:
  User turn: "Alexa, which one is taller, the space needle or the Eifel Tower?"
  Device turn: "Sorry, I don't know that."
  User turn: "Alexa, how tall is the space needle?"
  Device turn: "604 feet."
  User turn: "Alexa, how tall is the Eifel Tower?"
  Device turn: "1063 feet."

A correctness rate score may represent whether output data, of a device turn, was correct or not. A correctness rate score may be binary value, whereby one score (e.g., 1) may represent output data was correct and another score (e.g., 0) may represent output data was incorrect. The following is an example dialog in which the device turn may be considered incorrect:
  User turn: "Alexa, who won a Grammy in country music in 1994?"
  Device turn: "I think you wanted to listen to some country music, right?"
The following is an example dialog in which the device turn may be considered correct:
  User turn: "Alexa, who was best actor in 2016?"
  Device turn: "Casey Affleck won best actor in the $89^{th}$ academy awards."

Because the productivity scoring component 440 may compute correctness rate scores at a device turn level, the productivity scoring component 440 may compute more than one correctness rate score for a single multi-turn dialog. In such a scenario, the productivity scoring component 440 may generate an aggregated correctness rate score. In an example, the productivity scoring component 440 may compute an aggregated correctness rate score for a dialog by calculating an average across the individual correctness rate scores of the dialog, although it will be appreciated that other aggregation techniques are also possible.

A DSR scores may represent whether a user's goal was achieved or not. With respect to generating DSR scores, there may be different outcomes of a dialog, for example:

Success: the user's intent was satisfied by an action(s) performed by the natural language processing system 120;

Incorrect: natural language processing failed;

SystemError: natural language processing was successful by the natural language processing system 120 failed to perform an action in response to the natural language processing;

Unactionable: the user's request cannot be completed by the natural language processing system 120;

AlternateAction: the natural language processing system 120 cannot fulfill the user's request, and instead offers an alternative action; and UserAbandoned: a user input of the dialog indicated the user was no longer interested in an action being performed.

The following dialog is an example of the unactionable outcome:

User turn: "Alexa, who were the winners of the Grammy awards in 1994?"

Device turn: "Sorry, I am not sure."

Each of the above goal outcomes may be assigned a respective weight. In at least some examples, such weights may be between 0 and 1.

In at least some examples, the productivity scoring component 440 may compute a DSR score for a dialog as follows:

$$\frac{\text{\# of } SuccessfulGoals + \text{\# of } UnactionableGoals + \text{\# of } AlternateActions + \text{\# of } UserAbandonedGoals}{\text{\# of } SuccessfulGoals + \text{\# of } IncorrectGoals + \text{\# of } SystemErrorGoals + \text{\# of } UnactionableGoals + \text{\# of } AlternateActions + \text{\# of } UserAbandonedGoals}$$

One or more of the individual values, in the foregoing calculation, may be associated with a respective weight. In such examples, a value may be multiplied by its respective weight, and the resulting weighted value may be used in the foregoing DSR score calculation.

In at least some examples, the productivity scoring component 440 may compute a DSR score for a dialog as follows:

$$\frac{\sum_{i=1}^{n} Wi \cdot ETSRi}{\sum_{i=1}^{n} Wi}$$

where:

$ETSR_i$ (Estimated Turn Success Rate) is calculated as $(1-ETER_i)$; $ETER_i$ is the Estimated Turn Error Rate of ith turn; and $W_i$ is the weight of $ETSR_i$.

The productivity scoring component 440 may output a dialog productivity score. The productivity scoring component 440 may compute the dialog productivity score using different approaches depending upon implementation. In at least some examples, the productivity scoring component 440 may compute the dialog productivity score as:

$$\frac{\text{sum of individual scores calculated by the productiveness scoring component}}{\text{the number of individual scores calculated by the productiveness scoring component}}$$

Using the above description with respect to the productivity scoring component 440's processing, the productivity scoring component 435 may compute the dialog productivity score as:

$$\frac{\text{dialog efficiency score} + \text{correctness rate score} + DSR \text{ score}}{3}$$

The dialog scoring component 410 may output a dialog score. If each turn in a dialog is specific to a single intent, then a dialog score, for the dialog, may be specific to the intent as well. The dialog scoring component 410 may compute the dialog score using different approaches depending upon implementation. In at least some examples, the dialog scoring component 410 may compute the dialog score as:

$$\frac{\text{dialog naturalness score} + \text{dialog appropriateness score} + \text{dialog productiveness score}}{3}$$

In at least some examples, one or more of the dialog naturalness score, dialog relevance score, and dialog productivity score may be associated with a respective weight. In such examples, a score may be multiplied by its respective weight, and the resulting weighted score may be used in the foregoing dialog score calculation.

One or more dialogs may form a "conversation." The conversation scoring component 415 (referenced above) may be configured to score conversations. The conversation scoring component 415 may include a quality dialogs scoring component 445 and a coherence scoring component 450. The quality dialogs scoring component 445 may generate average dialog scores. The coherence scoring component 450 may generate structural consistency scores and dialog distance score. Average dialog, structural consistency, and dialog distance scores may collectively be used to measure how coherent and qualitative a conversation was.

An average dialog score, generated by the quality dialogs scoring component 445, may represent an average quality of the dialogs included within a conversation. In at least some examples, the average dialog score may be calculated as:

$$\frac{\text{sum of dialog scores for dialogs in conversation}}{\text{number of dialogs in conversation}}$$

In at least some examples, one or more of the dialog scores may be associated with a respective weight. In such examples, a dialog score may be multiplied by its respective weight, and the resulting weighted dialog score may be used in the foregoing average dialog score calculation.

A structural consistency score may represent whether conversation included logical transitions between dialog. A dialog distance score may represent how much dialogs, of a conversation, deviated from a topic.

The conversation scoring component 415 may output a conversation score. The conversation scoring component 415 may compute the conversation score using different approaches depending upon implementation. In at least some examples, the conversation scoring component 415 may compute the conversation score as:

$$\frac{\text{average dialog score} + \text{structural consistency score} + ddialog\text{ distance score}}{3}$$

In at least some examples, one or more of the scores, in the foregoing calculation, may be associated with a respective weight. In such examples, a score may be multiplied by its respective weight, and the resulting weighted score may be used in the foregoing conversation score calculation.

One or more conversations may form a "session." A session may include conversations that all include processing performed by a single skill, or a session may include conversations that include processing performed by more than one skill. A session may be represented as a "pattern," which is a coded representation of an order of a user using multiple skills in a session. A pattern provides a systematic approach to target cross-skill use cases such as when a user returns to an original skill after using another skill, or a user engages multiple skills sequentially without ever returning to any of the skills. Multiple types of patterns may be used.

An "external pattern" may refer to an order of each skill's appearance within a session. Each skill may be denoted by an indicator (e.g., alphabetical letter). For example, an external pattern of ABA may correspond to a user using a first skill, then a second skill, and then going back to the first skill. For further example, an external pattern of ABC may correspond to a user using a first skill, then using a second skill, then using a third skill.

An "internal pattern" may refer to a location of each skill within each session. Each skill may be denoted by an indicator different from the indicator used for an external pattern. For example, if alphabetical letters are used as indicators in an external pattern, numerical values may be used as indicators in corresponding internal patterns. Using the above external pattern of ABA as an example, the internal pattern for each of the first and second skills may be 123, with the first usage of the first skill being "1," the usage of the second skill being "2," and the second usage of the first skill being "3."

A session may include durations of time between when data is output to a user and when a user provides a subsequent user input. For example, such durations of time may correspond to 1 minute, 2 minutes, 5 minutes, ten minutes, etc. A first session may end and a new session may between if the duration of time meets or exceeds a threshold duration of time. As such, it will be appreciated that a user need not continually interact with the system 100 in order to keep a session ongoing.

In at least some examples, the conversation scoring component 415 (or a subcomponent thereof) may generate a prompt coverage score representing a degree to which data, generated by the natural language processing system 120 and/or skill system 125 for output to a user during dialogs of a conversation, was non-repetitive and non-monotonous, or was repetitive and monotonous depending on how the conversation scoring component 415 is configured. Prompt coverage scores, for dialogs of the conversation, may be averaged, added together, etc. to generate a prompt coverage score for a conversation including the dialogs.

The session scoring component 420 (referenced above) may be configured to score sessions. The session scoring component 420 may include a quality conversations scoring component 455 and a friction scoring component 460. The quality conversations scoring component 455 may generate average conversation scores. The friction scoring component 460 may generate friction scores. Average conversation scores and friction scores may collectively be used to measure how frictional and qualitative a session was.

An average conversation score, generated by the quality conversations scoring component 455, may represent an average quality of the conversations included within a session. In at least some examples, the average conversation score may be calculated as:

$$\frac{\text{sum of conversation scores for dialogs in session}}{\text{number of conversations in session}}$$

In at least some examples, one or more of the conversation scores may be associated with a respective weight. In such examples, a conversation score may be multiplied by its respective weight, and the resulting weighted conversation score may be used in the foregoing average conversation score calculation.

A friction score, generated by the friction scoring component 460, may represent a measure of friction between a user and the natural language processing system 120. In at least some examples, a friction score may be calculated as:

$$\frac{\text{\# of frictional user inputs}}{\text{\# of total user inputs in session}}$$

A "frictional user input" may refer to a user input corresponding to something a user was unsatisfied with. For example, a frictional user input may correspond to explicit user feedback indicating a system output was incorrect. For further example, a frictional user input may correspond to a user input that is received by a device 110 while the device 110 is outputting data. In another example, a frictional user input may being a reformulation of a previous user input (e.g., the frictional user input may repeat a previous user input using different wording). Other examples of frictional user inputs are possible.

In at least some examples, a friction score may be based on "confirmation" user inputs, which are user inputs where the user responds positively to output data. An example of a confirmation user input may be "yes" in response to the system outputting "the game you asked about is streaming live now, do you want me to turn it on." In at least some examples, a friction score may be based on explicit user feedback. In at least some examples, a friction score may be based on whether a user reformulated a user input (e.g., when two back-to-back user inputs correspond to reformulations of each other).

The session scoring component 420 may output a session score. The session scoring component 420 may compute the session score using different approaches depending upon implementation. In at least some examples, the session scoring component 420 may compute the session score as:

$$\frac{\text{average conversation score} + \text{friction score}}{2}$$

In at least some examples, one or more of the scores, in the foregoing calculation, may be associated with a respective weight. In such examples, a score may be multiplied by its respective weight, and the resulting weighted score may be used in the foregoing conversation score calculation.

The above described scores may be used in various manners. For example, dialog scores, conversation scores, and session scores may be used by the natural language processing system 120 to generally evaluate user dialogs, conversations, and sessions, with the natural language processing system 120, respectively.

One or more of the herein disclosed scores may be used to rate skills. For example, skills that correspond to higher dialog, conversation, and/or session scores may be rated higher than skills corresponding to lower dialog, conversation, and/or session scores. Such ratings, in at least some examples, may be used by the natural language processing system 120 at runtime to determine which skill should be invoked to executed with respect to a user input.

One or more of the herein disclosed scores may be used to determine whether filtering resources, or other resources, should be assigned to process data received from a skill prior to the data being output to a user. For example, when data is received from a skill, the natural language processing system 120 may determine one or more conformance scores, or one or more relevance scores, associated with the skill's identifier. If the natural language processing system 120 determines the conformance score(s) and/or the relevance score(s) satisfies a condition (e.g., satisfies a threshold score), then the natural language processing system 120 may cause the data to be output without processing the data to ensure it does not include profanity, etc. Conversely, if the natural language processing system 120 determines the conformance score(s) and/or the relevance score(s) fails to satisfy a condition (e.g., fails to satisfy a threshold score), the natural language processing system 120 may process the data to ensure it does not include profanity, etc. If the natural language processing system 120 determines the data includes profanity, etc., then the natural language processing system 120 may prevent the data from being output to a user. Conversely, if the natural language processing system 120 determines the data does not include profanity, etc., then the natural language processing system 120 may cause the data to be output to a user.

One or more of the herein disclosed scores may be used to measure whether changes to a skill's processing resulted in an improved user experience. For example, the scoring component 285 may calculate one or more of the herein disclosed scored with respect to a particular skill identifier. Thereafter, a developer of the skill may alter the skill's data to cause the skill to process differently. After the developer alters the skill's data, the scoring component 285 may calculate one or more of the herein disclosed scored with respect to one or more dialogs, conversations, and/or sessions corresponding to the skill's identifier. The former calculated score(s) may then be compared to the latter calculated score(s) to determine whether the altered data resulted in an improved user experience. The former and latter calculated scores, and/or an indicator of the foregoing comparison, may be sent to a skill system 125 corresponding to the skill identifier so the developer is aware of the impact of the altered data. Such may cause the developer to either leave the altered data (e.g., when the altered data resulted in a latter score(s) that was improved over the former score(s)) or further alter the data (e.g., when the altered data resulted in a latter score(s) that did not improve over the former score(s)).

Data, provided to the skill system 125 and the developer, may be provided in an anonymized fashion to maintain user privacy. For example, the natural language processing system 120 may send the data to a skill system 125 via an application program interface (API), dashboard, etc.

In at least some examples, patterns (both external and internal) may be used to create system experiences that make user transitioning between skills easier. For example, the natural language processing system 120 may determine a significant number of users interact with the natural language processing system 120 to perform a particular pattern. Based on this, the natural language processing system 120 may configure prompts to be output to users, whereby the prompts invite users to transition between skills based on the pattern. For example, the natural language processing system 120 may determine a significant number of users often invoke an airline booking skill and then a weather skill. Based on this, when a user thereafter invokes an airline booking skill, once the airline booking skill has booked a ticket the natural language processing system 120 may prompt the user "since you booked your ticket, would you like to check the weather for your trip." If the user responds affirmatively, the natural language processing system 120 may use context from the previous user and device turns performed to book the ticket (e.g., destination, dates, times, etc.) to determine and output weather information relevant to the user's trip.

Figure 8:
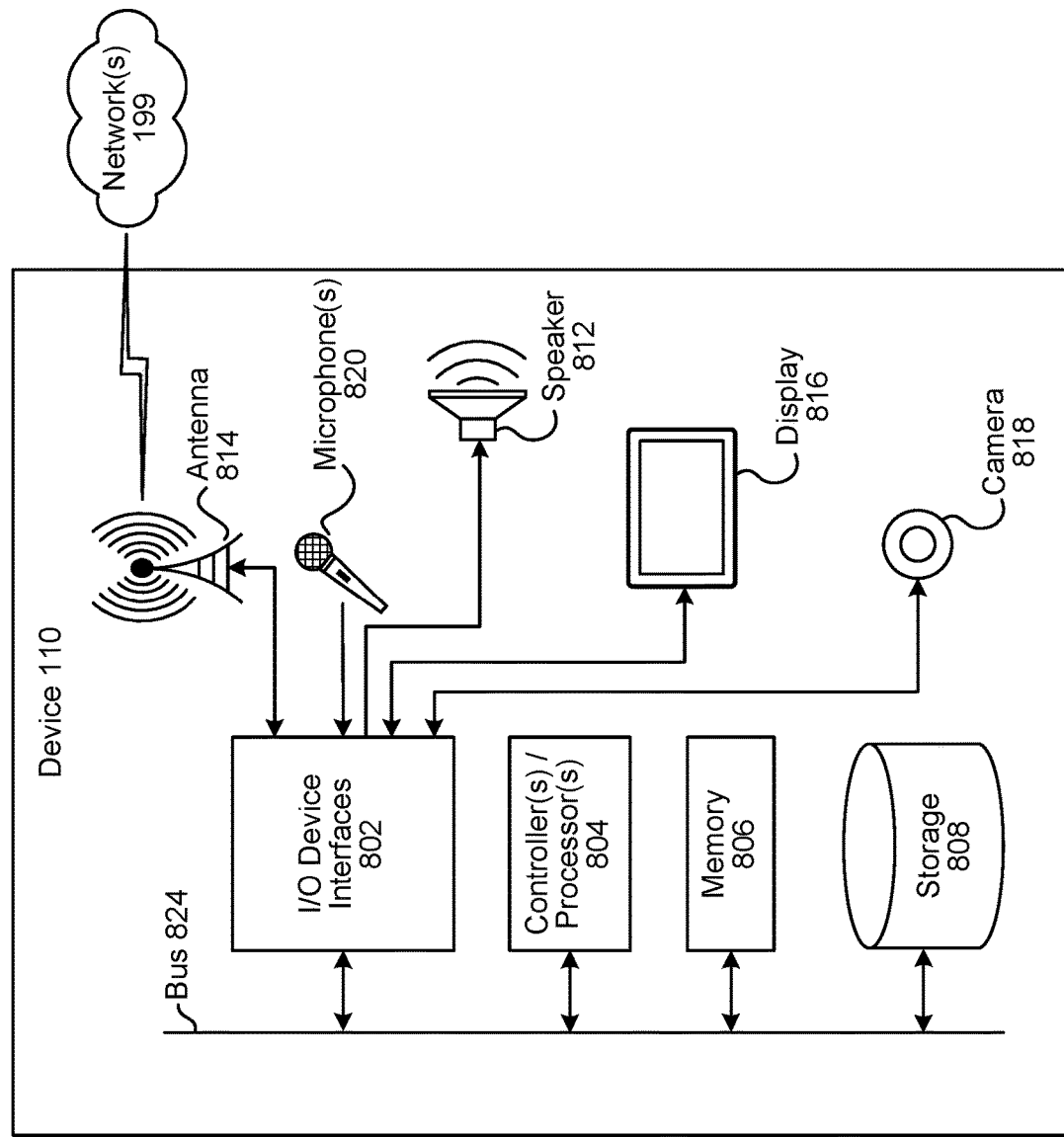
FIG. 8 is a block diagram conceptually illustrating example components of a device, in accordance with embodiments of the present disclosure.
Figure 9:
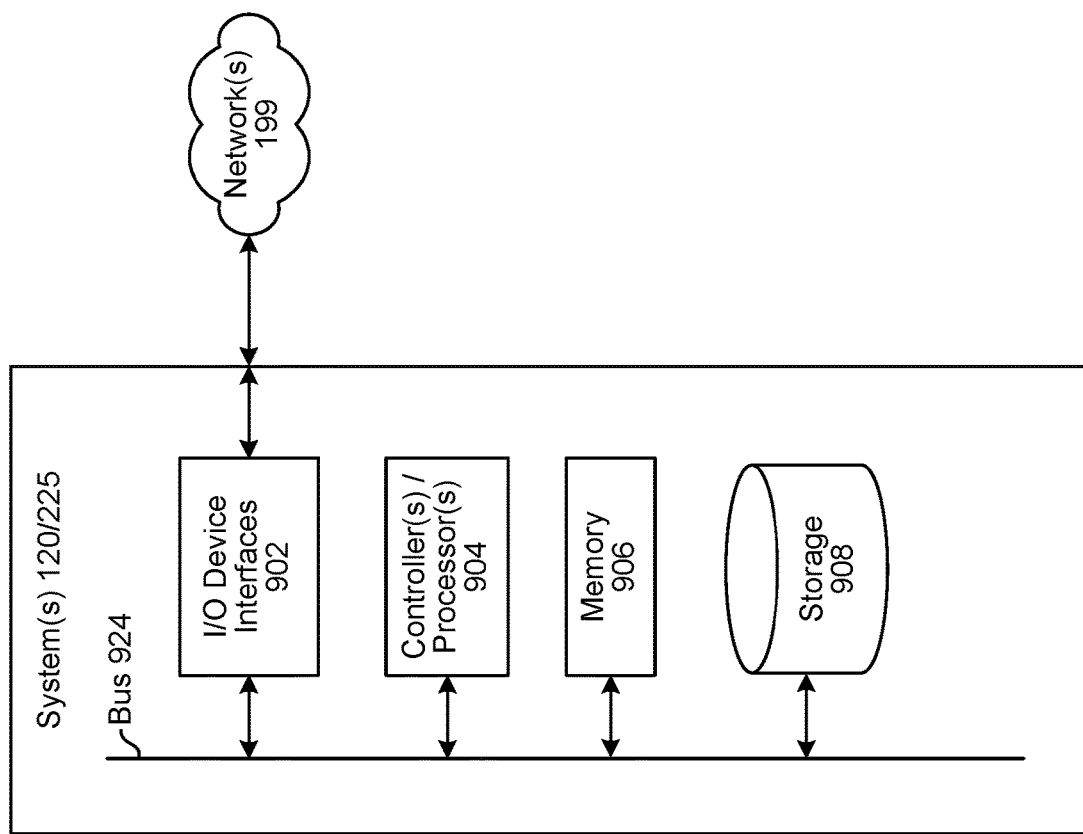
FIG. 9 is a block diagram conceptually illustrating example components of a system, in accordance with embodiments of the present disclosure.

FIG. 8 is a block diagram conceptually illustrating a device 110/112 that may be used with the system. FIG. 9 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill system(s) 225, etc. In operation, each of these systems may include computer-readable and computer-executable instructions that reside on the respective device (120/225), as will be discussed further below.

Each of these devices (110/112/120/225) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/112/120/225) may also include a data storage component (808/908) for storing data and controller/processor-executable instructions. Each data storage component (808/908) may individually include one or more non-volatile storage types such as magnetic storage, optical storage, solid-state storage, etc. Each device (110/112/120/225) may also be connected to removable or external non-volatile memory and/or storage (such as a removable memory card, memory key drive, networked storage, etc.) through respective input/output device interfaces (802/902).

Computer instructions for operating each device (110/112/120/225) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/112/120/225) includes input/output device interfaces (802/902). A variety of components may be connected through the input/output device interfaces (802/902), as will be discussed further below. Additionally, each device (110/112/120/225) may include an address/data bus (824/924) for conveying data among components of the respective device. Each component within a device (110/112/120/225) may also be directly connected to other components in addition to (or instead of) being connected to other components across the bus (824/924).

Referring to FIG. 8, the device 110/112 may include input/output device interfaces 802 that connect to a variety of components such as an audio output component such as a speaker 812, a wired headset or a wireless headset (not illustrated), or other component capable of outputting audio. The device 110/112 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110/112 may additionally include a display 816 for displaying content. The device 110/112 may further include a camera 818.

Via antenna(s) 814, the input/output device interfaces 802 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110/112, the system(s) 120, or the skill system(s) 225 may include their own dedicated processors, memory, and/or storage. Alternatively, one or more of the components of the device(s) 110/112, the system(s) 120, or the skill system(s) 225 may utilize the I/O interfaces (802/902), processor(s) (804/904), memory (806/906), and/or storage (808/908) of the device(s) 110/112 system(s) 120, or the skill system(s) 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110/112, the system(s) 120, and the skill system(s) 225, as described herein, are illustrative, and may be located as a stand-alone device or may be included, in whole or in part, as a component of a larger device or system.

As illustrated in FIG. 10, multiple devices (110a-110j, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a microwave 110j may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
receiving first user input data corresponding to a request to be performed a skill component, the first user input data representing a first user input as part of a dialog exchange;
associating the first user input data with a dialog identifier;
receiving, from the skill component, first system output data responsive to the first user input data;
associating the first system output data with the dialog identifier;
causing the first system output data to be presented to a user;
after causing presentation of the first system output data, receiving second user input data representing a second user input as part of the dialog exchange;
associating the second user input data with the dialog identifier;
receiving, from the skill component, second system output data responsive to the second user input data;
associating the second system output data with the dialog identifier;
causing the second system output data to be presented to the user;
determining that the dialog exchange has ended;
determining a user type associated with the dialog exchange;
determining first data representing at least one of the first system output data and second system output data included a first type of content;
determining second data representing at least one of the first system output data and the second system output data included profanity;
determining third data representing a relevance of the dialog exchange, the third data being determined based at least in part on determining the first system output data and second system output data was generated based at least in part on the user type; and
based at least in part on the first data, the second data, and the third data, determining one or more filtering resources are to be assigned to process future system output data, received from the skill component, prior to presenting the future system output data to a user.

2. The method of claim 1, wherein the dialog exchange corresponds to a first user goal and wherein the method further comprises:
receiving third user input data;
determining the third user input data corresponds to a second user goal;
associating the third user input data with a second dialog identifier; and
based at least in part on associating the third user input data with the second dialog identifier, determining the dialog exchange has ended,
wherein the first data and the second data are determined after the dialog exchange has ended.

3. The method of claim 1, further comprising:
determining the first user input data corresponds to a first natural language understanding (NLU) intent corresponding to the skill component;
receiving third user input data; and
determining the third user input data corresponds to a second NLU intent corresponding to a second skill component,
wherein the first data and the second data are determined after determining the third user input data corresponds to the second NLU intent.

4. The method of claim 1, further comprising:
receiving third user input data;
determining third system output data responsive to the third user input data; and
determining the third system output data was generated independent of information represented in at least one of the first user input data, the first system output data, the second user input data, or the second system output data,
wherein the first data and the second data are determined after determining the third system output data was generated independent of information represented in at least one of the first user input data, the first system output data, the second user input data, or the second system output data.

5. A system comprising:
at least one processor; and
at least one memory comprising instructions that, when executed by the at least one processor, cause the system to:
determine user input data and system output data corresponding to a dialog exchange between a user and a skill component;
determine a user type associated with the dialog exchange;
determine first data representing a relevance of the dialog exchange, the first data being determined based at least in part on determining the system output data was generated based at least in part on the user type; and
determine, based at least in part on the first data, one or more filtering resources are to be assigned to process future data, received from the skill component, prior to presenting the future data to a user.

6. The system of claim 5, wherein the at least one memory further comprises instructions that, when executed by the at least one processor, further cause the system to:
determine the dialog exchange has ended,
wherein determining the one or more filtering resources are to be assigned is determined after determining the dialog exchange has ended.

7. The system of claim 6, wherein the dialog exchange corresponds to a first user goal and wherein the at least one memory further comprises instructions that, when executed by the at least one processor, further cause the system to:
receive second user input data; and
determine the second user input data corresponds to a second user goal,
wherein determining the dialog exchange has ended is further based at least in part on determining the second user input data corresponds to the second user goal.

8. The system of claim 6, wherein the at least one memory further comprises instructions that, when executed by the at least one processor, further cause the system to:
determine the user input data corresponds to a first natural language understanding (NLU) intent;
receive second user input data; and
determine the second user input data corresponds to a second NLU intent,
wherein determining the dialog exchange has ended is further based at least in part on determining (i) the user input data corresponds to the first NLU intent and (ii) the second user input data corresponds to the second NLU intent.

9. The system of claim 6, wherein the at least one memory further comprises instructions that, when executed by the at least one processor, further cause the system to:
receive second user input data;
determine second system output data responsive to the second user input data; and
determine the second system output data was generated independent of information represented in at least one previous user input or at least one previous system output of the dialog exchange,
wherein determining the dialog exchange has ended is further based at least in part on determining the second system output data was generated independent of information represented in at least one previous user input or at least one previous system output of the dialog exchange.

10. The system of claim 5, wherein the at least one memory further comprises instructions that, when executed by the at least one processor, further cause the system to:
determine the system output data included profanity,
wherein determining the one or more filtering resources are to be assigned further based at least in part on the system output data including profanity.

11. The system of claim 5, wherein the at least one memory further comprises instructions that, when executed by the at least one processor, further cause the system to:
determine second data representing an accuracy of the system output data, the second data being determined based at least in part on:
determining the dialog exchange corresponds to a user goal;
determining a first value representing a first number of user inputs and system outputs corresponding to at least one previous dialog exchange corresponding to the user goal;
determining a second value representing a second number of user inputs and system outputs of the dialog exchange;
determining a difference between the second value to the first value; and
determining third data representing the user goal was completed.

12. A method comprising:
determining user input data and system output data corresponding to a dialog exchange between a user and a skill component;
determining a user type associated with the dialog exchange;
determining first data representing a relevance of the dialog exchange, the first data being determined based at least in part on determining the system output data was generated based at least in part on the user type; and
determining, based at least in part on the first data, one or more filtering resources are to be assigned to process future data, received from the skill component, prior to presenting the future data to a user.

13. The method of claim 12, further comprising:
determining the dialog exchange has ended,
wherein determining the one or more filtering resources are to be assigned is determined after determining the dialog exchange has ended.

14. The method of claim 13, wherein the dialog exchange corresponds to a first user goal and wherein the method further comprises:
receiving second user input data; and
determining the second user input data corresponds to a second user goal, wherein determining the dialog exchange has ended is further based at least in part on determining the second user input data corresponds to the second user goal.

15. The method of claim 13, further comprising:
determining the user input data corresponds to a first natural language understanding (NLU) intent;
receiving second user input data; and
determining the second user input data corresponds to a second NLU intent,
wherein determining the dialog exchange has ended is further based at least in part on determining (i) the user input data corresponds to the first NLU intent and (ii) the second user input data corresponds to the second NLU intent.

16. The method of claim 13, further comprising:
receiving second user input data;
determining second system output data responsive to the second user input data; and
determining the second system output data was generated independent of information represented in at least one previous user input or at least one previous system output of the dialog exchange,
wherein determining the dialog exchange has ended is further based at least in part on determining the second system output data was generated independent of information represented in at least one previous user input or at least one previous system output of the dialog exchange.

17. The method of claim 12, further comprising:
determining the system output data included profanity,
wherein determining the one or more filtering resources are to be assigned is further based at least in part on the system output data including profanity.

18. The method of claim 12, further comprising:
determining second data representing an accuracy of the system output data, the second data being determined based at least in part on:
  determining the dialog exchange corresponds to a user goal;
  determining a first value representing a first number of user inputs and system outputs corresponding to at least one previous dialog exchange corresponding to the user goal;
  determining a second value representing a second number of user inputs and system outputs of the dialog exchange;
  determining a difference between the second value to the first value; and
  determining third data representing the user goal was completed.

* * * * *